(12) United States Patent
Tardivat et al.

(10) Patent No.: US 7,488,768 B2
(45) Date of Patent: *Feb. 10, 2009

(54) RUBBER COMPOSITION COMPRISING A POLYFUNCTIONAL ORGANOSILANE AS COUPLING AGENT

(75) Inventors: Jean-Claude Tardivat, Clermont-Ferrand (FR); Salvatore Pagano, Chamalieres (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/411,615

(22) Filed: Apr. 10, 2003

(65) Prior Publication Data

US 2004/0051210 A1    Mar. 18, 2004

Related U.S. Application Data

(63) Continuation of application No. PCT/EP01/11669, filed on Oct. 9, 2001.

(30) Foreign Application Priority Data

Oct. 13, 2000    (FR)    .................................... 00 13255

(51) Int. Cl.
    *C08K 5/5419*    (2006.01)
    *C08K 3/04*    (2006.01)
    *C08K 3/36*    (2006.01)
    *B60C 1/00*    (2006.01)

(52) U.S. Cl. ................. 524/262; 524/261; 524/492; 524/495; 524/571; 152/209.1; 152/905

(58) Field of Classification Search ................. 524/262, 524/267, 392, 571
    See application file for complete search history.

(56) References Cited

U.S. PATENT DOCUMENTS

| 4,390,648 | A | * | 6/1983 | Stacy | ..................... 523/216 |
| 5,822,097 | A | * | 10/1998 | Tournois | ..................... 385/37 |
| 5,852,097 | A | * | 12/1998 | Kikuchi | ..................... 524/492 |

FOREIGN PATENT DOCUMENTS

| DE | 19915281 | 10/2000 |
| EP | 0680997 | 11/1995 |
| EP | 0791622 | 8/1997 |
| WO | WO 00/53671 | 9/2000 |

OTHER PUBLICATIONS

Hawley's Condensed Chemical Dictionary, 2004.*

* cited by examiner

*Primary Examiner*—Vasu Jagannathan
*Assistant Examiner*—Vickey Ronesi
(74) *Attorney, Agent, or Firm*—Buchanan Ingersoll & Rooney PC

(57) ABSTRACT

An elastomer composition based on at least one diene elastomer, an inorganic filler as reinforcing filler, a polyfunctional organosilane as (inorganic filler/diene elastomer) coupling agent bearing at least two functions denoted "X" and "Y" which are graftable, on the one hand, to the elastomer by means of the X function and, on the other, to the inorganic filler by means of the Y function, characterized in that said Y function is a hydroxysilyl function ($\equiv$Si—OH). Preferably, this organosilane is a hydroxysilane polysulfide, the diene elastomer is selected from the group consisting of polybutadienes, natural rubber, synthetic polyisoprenes, butadiene copolymers, isoprene copolymers and the reinforcing inorganic filler is a siliceous or aluminous filler of the highly dispersible type. Tires or semi-finished products for tires, in particular treads for tires comprising a composition according to the invention.

40 Claims, 1 Drawing Sheet

RUBBER COMPOSITION COMPRISING A POLYFUNCTIONAL ORGANOSILANE AS COUPLING AGENT

Figure 1:
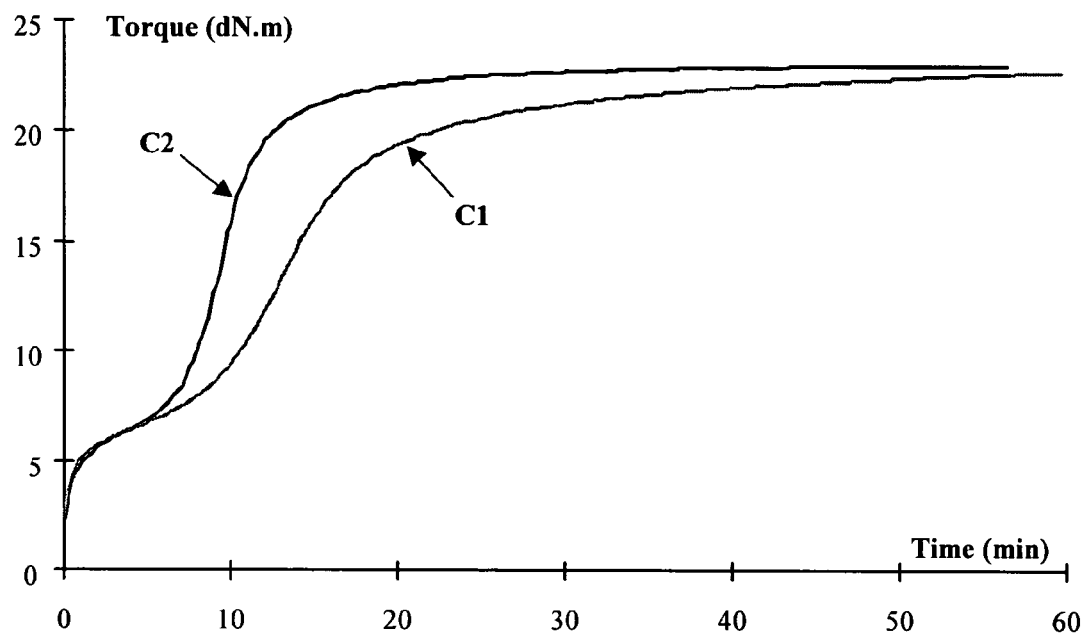

The present application is a continuation of International Application No. PCT/EP01/11669, filed 9, Oct. 2001, published in French with an English Abstract on 18, Apr. 2002 under PCT Article 21(2), which claims priority to French Patent Application No. FR00/13255, filed 13, Oct. 2000.

The present invention relates to diene elastomer compositions reinforced with an inorganic filler which can be used for the manufacture of tires or semi-finished products for tires, in particular treads for these tires.

The invention in particular relates to the coupling agents usable for coupling reinforcing inorganic fillers and diene elastomers in such elastomer compositions.

It is generally known that in order to obtain the optimum reinforcement properties imparted by a filler, the latter should be present in the elastomeric matrix in a final form which is both as finely divided as possible and distributed as homogeneously as possible. Now, such conditions may only be obtained insofar as the filler has a very good ability firstly to be incorporated into the matrix during mixing with the elastomer and to disagglomerate, and secondly to be dispersed homogeneously in this matrix.

It is fully known that carbon black has such abilities, which is generally not true of inorganic fillers. For reasons of mutual attraction, the inorganic filler particles have an irritating tendency to agglomerate together within the elastomeric matrix. These interactions have the harmful consequence of limiting the dispersion of the filler and hence the reinforcing properties to a substantially lower level than that which it would be theoretically possible to achieve if all the (inorganic filler/elastomer) bonds that could be created during the mixing operation were in fact obtained; these interactions furthermore tend to increase the consistency of the rubber compositions in the uncured state and therefore to make them more difficult to work ("processability") than in the presence of carbon black.

Since fuel economies and the need to protect the environment have become priorities, it has however proved necessary to produce tires having reduced rolling resistance, without adversely affecting their wear resistance. This has been made possible in particular due to the discovery of new rubber compositions reinforced with specific inorganic fillers referred to as "reinforcing" fillers, which are capable of rivalling conventional tire-grade carbon black from the reinforcing point of view, and furthermore offering these compositions lower hysteresis, which is synonymous with lower rolling resistance for the tires comprising them.

Such rubber compositions, comprising reinforcing inorganic fillers of the siliceous or aluminous type, have for example been described in patents or patent applications EP-A-0501227 (or U.S. Pat. No. 5,227,425), EP-A-0735088 (or U.S. Pat. No. 5,852,099), EP-A-0810258 (or U.S. Pat. No. 5,900,449), EP-A-0881252, WO99/02590, WO99/02601, WO99/02602, WO99/28376, WO00/05300 and WO00/05301.

Mention will be made in particular of documents EP-A-0501227, EP-A-0735088 or EP-A-0881252, which disclose diene rubber compositions reinforced with precipitated silicas of high dispersibility, such compositions making it possible to manufacture treads having a significantly improved rolling resistance, without adversely affecting the other properties, in particular those of grip, endurance and wear resistance. Such compositions having such a compromise of contradictory properties are also described in applications EP-A-0810258 and WO99/28376, with specific aluminous fillers (aluminas or aluminium (oxide-)hydroxides) of high dispersibility as reinforcing inorganic fillers, or alternatively in applications WO00/73372 and WO00/73373, which describe specific titanium oxides of the reinforcing type.

Although the use of these specific, highly dispersible inorganic fillers as reinforcing fillers, whether or not as the majority component, has reduced the difficulties of processing the rubber compositions containing them, such compositions are still more difficult to process than are rubber compositions filled conventionally with carbon black.

In particular, it is necessary to use a coupling agent, also known as a bonding agent, the function of which is to provide the connection between the surface of the inorganic filler particles and the elastomer, while facilitating the dispersion of this inorganic filler within the elastomeric matrix.

It will be recalled that (inorganic filler/elastomer) "coupling agent" should, in known manner, be taken to mean an agent capable of establishing a sufficient chemical and/or physical connection between the inorganic filler and the diene elastomer; such a coupling agent, which is at least bifunctional, has, for example, the simplified general formula "Y-W-X", in which:

Y represents a functional group ("Y" function) which is capable of bonding physically and/or chemically with the inorganic filler, it being possible to establish such a bond, for example, between a silicon atom of the coupling agent and the hydroxyl (OH) surface groups of the inorganic filler (for example, surface silanols in the case of silica);

X represents a functional group ("X" function) which is capable of bonding physically and/or chemically with the diene elastomer, for example by means of a sulfur atom;

W represents a divalent group making it possible to link Y and X.

The coupling agents must in particular not be confused with simple agents for covering the inorganic filler which, in known manner, may comprise the Y function which is active with respect to the inorganic filler but are devoid of the X function which is active with respect to the diene elastomer.

Coupling agents, in particular silica/diene elastomer coupling agents, have been described in numerous documents, the best known being bifunctional organosilanes bearing at least one alkoxyl function as the Y function, and, as the X function, at least one function capable of reacting with diene elastomer, such as for example a sulfur function (i.e. comprising sulfur).

Thus it was proposed in patent applications FR-A-2094859 or GB-A-1310379 to use a mercaptoalkoxysilane coupling agent for the manufacture of treads for tires. It was quickly shown, and is today well known, that mercaptoalkoxysilanes are capable of giving excellent silica/elastomer coupling properties, but that these coupling agents cannot be used industrially because of the high reactivity of the thiol-type —SH functions (X functions), which very rapidly results in premature vulcanization during the preparation of the rubber composition in an internal mixer, this also being known as "scorching", in very high viscosities in the uncured state and, finally, in rubber compositions which are virtually impossible to work and process industrially. Mention may be made, for example, of documents FR-A-2206330, U.S. Pat. Nos. 3,873,489, 4,002,594 to illustrate this problem.

To overcome this drawback, it has been proposed to replace these mercaptoalkoxysilanes by polysulfurised alkoxysilanes, in particular bis-(alkoxysilylpropyl) polysulfides such as described in numerous documents (see for example FR-A-

2149339, FR-A-2206330, U.S. Pat. Nos. 3,842,111, 3,873,489, 3,997,581, EP-A-680997 or U.S. Pat. No. 5,650,457, EP-A-791622 or U.S. Pat. No. 5,733,963, DE-A-19951281 or EP-A-1043357, WO00/53671). Among these polysulfides, bis-3-triethoxysilylpropyl tetrasulfide (abbreviated to TESPT) and bis-3-triethoxysilylpropyl disulfide (abbreviated to TESPD) must in particular be mentioned.

These polysulfurised alkoxysilanes, in particular TESPT, are generally considered to be the products which achieve, for vulcanized rubber compositions comprising a reinforcing inorganic filler, in particular silica, the best compromise in terms of resistance to scorching, ease of processing and reinforcing action. Today, they are in this respect the most widely used coupling agents in rubber compositions for tires, even if they are relatively costly and, furthermore, must most frequently be used in a relatively large quantity.

The alkoxysilane polysulfides do, however, have the disadvantage of substantially retarding the vulcanization kinetics of the rubber compositions containing them in comparison with the kinetics of conventional compositions reinforced with carbon black. The resultant longer duration of curing may impair industrial processing of these rubber compositions reinforced with inorganic fillers and of the rubber articles containing them.

The Applicants have now discovered in the course of their research that certain specific organosilanes unexpectedly remedy this drawback relating to the duration of curing, furthermore without impairing coupling and thus reinforcement properties, and so provide for elastomer compositions an improved compromise of properties in comparison with that hitherto achieved with polysulfurised alkoxysilanes, in particular with TESPT.

These specific alkoxysilanes furthermore do not have the aforementioned problems of premature scorching and of processing which are due to excessive viscosity of the rubber compositions in the uncured state, which disadvantages are inherent in mercaptoalkoxysilanes.

Consequently, a first subject of the invention relates to an elastomer based on at least a diene elastomer, an inorganic filler as reinforcing filler, a polyfunctional organosilane as (inorganic filler/diene elastomer) coupling agent bearing at least two functions denoted "X" and "Y" which are graftable, on the one hand, to the elastomer by means of the X function and, on the other, to the inorganic filler by means of the Y function, this composition being characterised in that said Y function is a hydroxysilyl function (≡Si—OH). In other words, this organosilane falls within the category of hydroxysilanes.

As far as the Applicants are aware, organosilanes fulfilling this definition have never hitherto been used as coupling agents in rubber compositions reinforced with an inorganic filler, nor have they ever been synthesised due to the strong prejudices regarding the recognised instability of organosilanes bearing hydroxyl functions. It should be recalled here that this instability is due to the strong propensity of hydroxysilyl groups (≡Si—OH), especially in the presence of strong acids (which are moreover generated during synthesis of organoxysilanes from halogenated silanes), to condense with themselves to form ≡Si—O—Si≡ linkages, in other words siloxane linkages; this mechanism is moreover exploited in the synthesis of polysiloxanes (see for example for the following references: "*The Chemistry of organic silicon compounds*", S. Patai and Z. Rappoport, John Wiley & Sons, 1989, Part I, 722-725; "*Siloxane polymers*", S. J. Clarson and J. A. Semlyen, Ellis Horwood Pretice-Hall, Elgelwood Cliffs N.J., 1993, 577-578; 597).

The subject of the invention is also the use of an elastomer composition according to the invention for the manufacture of tires or for the manufacture of semi-finished products intended for such tires, these semi-finished products being selected in particular from among the group comprising treads, underlayers intended for example to be positioned beneath these treads, crown plies, sidewalls, carcass plies, beads, protectors, inner tubes and airtight internal rubbers for tubeless tires.

The subject of the invention is also these tires and these semi-finished products themselves, when they comprise an elastomer composition according to the invention, these tires possibly being in particular intended for passenger vehicles and also industrial vehicles selected from among vans, "heavy vehicles"—i.e. subway trains, buses, road transport machinery (lorries, tractors, trailers), off-road vehicles—agricultural machinery or construction machinery, aircraft, and other transport or materials handling vehicles.

The invention relates in particular to the treads of such tires, it being possible to use these treads for the manufacture of new tires or for recapping worn tires; by virtue of the compositions of the invention, these treads have all of the following: low rolling resistance, very good grip and high wear resistance, together with improved vulcanization kinetics.

The rubber compositions according to the invention with improved vulcanization kinetics may be prepared by a process characterised in that there are incorporated into at least one diene elastomer at least one inorganic filler as reinforcing filler and a polyfunctional organosilane as (inorganic filler/diene elastomer) coupling agent bearing at least two functions denoted "X" and "Y" which are graftable, on the one hand, to the elastomer by means of the X function and, on the other, to the inorganic filler by means of the Y function, said Y function being a hydroxysilyl function (≡Si—OH), and in that the entire mixture is kneaded thermomechanically in one or more stages until a maximum temperature of between 110° C. and 190° C. is reached.

The subject of the invention is also the use of a polyfunctional hydroxysilane as defined above as (inorganic filler/diene elastomer) coupling agent in a diene elastomer-based composition reinforced with an inorganic filler.

The subject of the invention is also a process for coupling an inorganic filler and a diene elastomer, in an elastomer composition, this process being characterised in that there are incorporated into at least one diene elastomer at least one inorganic filler as reinforcing filler and a polyfunctional organosilane bearing at least two functions denoted "X" and "Y" which are graftable, on the one hand, to the elastomer by means of the X function and, on the other, to the inorganic filler by means of the Y function, said Y function being a hydroxysilyl function (≡Si—OH), and in that the entire mixture is kneaded thermomechanically in one or more stages until a maximum temperature of between 110° C. and 190° C. is reached.

Figure 2:
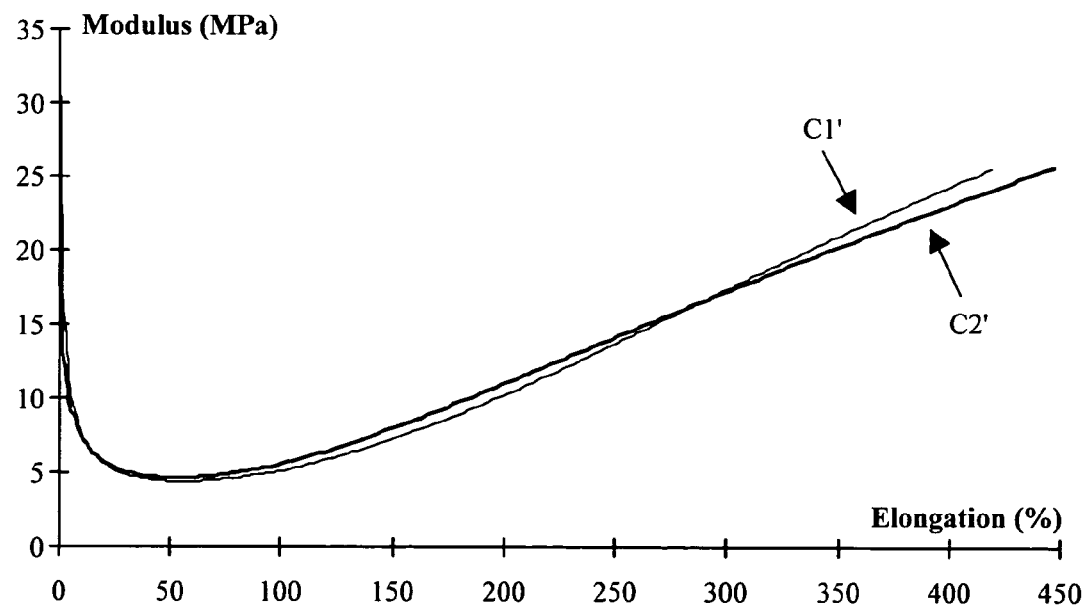

The invention and its advantages will be readily understood in the light of the description and examples of embodiment which follow, together with the figures relating to those examples, which show:

FIG. 1: rheograms (curing curves) recorded for rubber compositions, whether or not in accordance with the invention;

FIG. 2: curves of the variation of modulus as a function of elongation for these rubber compositions.

I. MEASUREMENTS AND TESTS USED

The rubber compositions are characterised before and after curing, as indicated below.

I-1. Mooney Plasticity

An oscillating consistometer such as described in French Standard NF T 43-005 (1991) is used. Mooney plasticity is measured in accordance with the following principle: the raw composition (i.e. before curing) is moulded in a cylindrical enclosure heated to 100° C. After one minute's preheating, the rotor turns within the test specimen at 2 rpm, and the torque used for maintaining this movement is measured after four minutes' rotation. Mooney plasticity (ML 1+4) is expressed in "Mooney units" (MU, with 1 MU=0.83 N·m).

I-2. Scorching Time

The measurements are made at 130° C., in accordance with French Standard NF T 43-005 (1991). The change in the consistometric index as a function of time makes it possible to determine the scorching time for the rubber compositions, assessed in accordance with the above standard by the parameter T5 (case of a large rotor), expressed in minutes, and defined as being the time necessary to obtain an increase in the consistometric index (expressed in MU) of 5 units above the minimum value measured for this index.

I-3. Tensile Tests

These tests make it possible to determine elasticity stresses and breaking properties. Unless indicated otherwise, they are performed in accordance with French Standard NF T 46-002 of September 1988. The nominal secant moduli (or apparent stresses, in MPa) at 10% elongation (M10), 100% elongation (M100) and 300% elongation (M300) are measured in a second elongation (i.e. after a cycle of accommodation to the amount of extension provided for the measurement itself). Breaking stresses (in MPa) and elongations at break (in %) are also measured. All these tensile measurements are performed under normal conditions of temperature and relative humidity in accordance with French Standard NF T 40-101 (December 1979).

Processing the tensile data recorded also makes it possible to plot the curve of modulus as a function of elongation (see attached FIG. 2), the modulus used here being the true secant modulus measured in a first elongation, calculated on the basis of the true cross-section of the test specimen and not on the basis of the initial cross-section as previously for the nominal moduli.

I-4. Dynamic Properties

Dynamic properties are measured on a viscoanalyser (Metravib VA4000), in accordance with ASTM Standard D 5992-96. The response of a sample of vulcanized composition (cylindrical test specimen of a thickness of 4 mm and a cross-section of 400 mm²), subjected to an alternating single sinusoidal shearing stress, at a frequency of 10 Hz, under normal temperature conditions (23° C.) in accordance with Standard ASTM D 1349-99, is recorded. Scanning is performed at an amplitude of deformation of 0.1 to 50% (outward cycle), then of 50% to 1% (return cycle); on the return cycle, the maximum observed value of the loss factor tan(δ) is recorded, the value being denoted $\tan(\delta)_{max}$.

I-5. Rheometry

The measurements are performed at 150° C. using an oscillating chamber rheometer in accordance with Standard DIN 53529, part 3 (June 1983). The change in rheometric torque over time describes the course of stiffening of the composition as a result of the vulcanization reaction (see FIG. 1 attached). The measurements are processed in accordance with Standard DIN 53529, part 2 (March 1983): minimum and maximum torque values, measured in deciNewton.meter (dN.m) are respectively denoted $C_{min}$ and $C_{max}$; $t_i$ is the induction time, i.e. the time required for the vulcanization reaction to begin; $t_\alpha$ (for example $t_{99}$) is the time necessary to achieve conversion of α%, i.e. α% (for example 99%) of the difference between the minimum and maximum torque values. The difference, denoted Δtorque (in dN·m), between minimum and maximum torque values is also measured, as is the conversion rate constant K (in min⁻¹), which allows an assessment of vulcanization kinetics to be made.

II. CONDITIONS Of CARRYING OUT THE INVENTION

The rubber compositions according to the invention are based on at least each of the following constituents:
(i) a (at least one) diene elastomer;
(ii) a (at least one) inorganic filler as reinforcing filler;
(iii) a (at least one) polyfunctional organosilane as (inorganic filler/diene elastomer) coupling agent bearing at least two functions ("X" and "Y") which are graftable, on the one hand, to the elastomer by means of the X function and, on the other, to the inorganic filler by means of a hydroxysilyl function ("Y") (≡SiOH).

Of course, the expression composition "based on" is to be understood to mean a composition comprising the mix and/or the in situ reaction product of the various constituents used, some of these base constituents being liable to, or intended to, react together, at least in part, during the different phases of manufacture of the composition, in particular during the vulcanization thereof.

II-1. Diene Elastomer

"Diene" elastomer or rubber is understood to mean, in known manner, an elastomer arising at least in part (i.e. a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such a s butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood in particular to be meant by diene elastomer capable of being used in the compositions according to the invention:
(a)—any homopolymer obtained by polymerisation of a conjugated diene monomer having 4 to 12 carbon atoms;
(b)—any copolymer obtained by copolymerisation of one or more conjugated dienes with each other or with one or more vinyl aromatic compounds having 8 to 20 carbon atoms;

(c)—any ternary copolymer obtained by copolymerisation of ethylene, of an α-olefin having 3 to 6 carbon atoms with a unconjugated diene monomer having 6 to 12 carbon atoms, such as, for example, the elastomers obtained from ethylene, from propylene with a unconjugated diene monomer of the aforementioned type, such as in particular 1,4-hexadiene, ethylidene norbornene or dicyclopentadiene;

(d)—any copolymer of isobutene and isoprene (butyl rubber), together with halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl-aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers m ay have any microstructure, which is a function of the polymerisation conditions used, in particular of the presence or absence of a modifying and/or randomising agent and the quantities of modifying and/or randomising agent used. The elastomers may for example be block, random, sequenced or microsequenced elastomers, and may be prepared in a dispersion or in solution they may be coupled and/or starred or alternatively functionalised with a coupling and/or starring or functionalising agent.

Preferred are polybutadienes, and in particular those having a content of 1,2-units between 4% and 80%, or those having a cis-1,4 content of more than 80%, polyisoprenes, butadiene-styrene copolymers, and in particular those having a styrene content of between 5% and 50% by weight and, more particularly, between 20% and 40%, a content of 1,2-bonds of the butadiene moiety of between 4% and 65%, and a content of trans-1,4 bonds of between 20% and 80%, butadiene-isoprene copolymers and in particular those having an isoprene content of between 5% and 90% by weight and a glass transition temperature ("Tg"—measured in accordance with ASTM Standard D3418-82) of between −40° C. and −80° C., isoprene-styrene copolymers and in particular those having a styrene content of between 5% and 50% by weight and a Tg of between −25° C. and −50° C.

In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene moiety of between 4% and 85%, a content of trans-1,4 units of the butadiene moiety of between 6% and 80%, a content of 1,2— plus 3,4-units of the isoprene moiety of between 5% and 70%, and a content of trans-1,4 units of the isoprene moiety of between 10% and 50%, and more generally any butadiene-styrene-isoprene copolymer having a Tg of between −20° C. and −70° C.

According to a preferred embodiment of the invention, the diene elastomer of the composition according to the invention is selected from the group of highly unsaturated diene elastomers which consists of polybutadienes (BR), synthetic polyisoprenes (IR) or natural rubber (NR), butadiene-styrene copolymers (SBR), butadiene-isoprene copolymers (BIR), butadiene-acrylonitrile copolymers (NBR), isoprene-styrene copolymers (SIR), butadiene-styrene-isoprene copolymers (SBIR), and mixtures of these elastomers.

The composition according to the invention is particularly intended for a tread for a tire, be it a new or a used tire (case of recapping).

When such a tread is intended, for example, for a passenger-car tire, the diene elastomer is preferably an SBR or an SBR/BR, SBR/NR (or SBR/IR) or also BR/NR (or BR/IR) blend (mixture). In the case of an SBR elastomer, in particular an SBR having a styrene content of between 20% and 30% by weight, a content of vinyl bonds of the butadiene moiety of between 15% and 65%, a content of trans-1,4 bonds of between 15% and 75%, and a Tg of between −20° C. and −55° C. is used, this SBR copolymer, which is preferably prepared in solution (SSBR), possibly being used in a mixture with a polybutadiene (BR) having preferably more than 90% cis-1,4 bonds.

When the tread is intended for a tire for a utility vehicle such as a heavy vehicle, the diene elastomer is preferably an isoprene elastomer. "Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene-isoprene copolymers (butyl rubber—IIR), isoprene-styrene copolymers (SIR), isoprene-butadiene copolymers (BIR) and isoprene-butadiene-styrene copolymers (SBIR). Isoprene elastomer is preferably natural rubber or a synthetic polyisoprene of the cis-1,4 type. Of these synthetic polyisoprenes, those polyisoprenes having a content (mol %) of cis-1,4 bonds greater than 90%, more preferably still greater than 98%, are preferably used. Of course, the diene elastomer may also be formed, in part, by another highly unsaturated elastomer such as, for example, an SBR elastomer.

According to another advantageous embodiment of the invention, in particular when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

II-2. Reinforcing Filler

The white or inorganic filler used as reinforcing filler may constitute all or only part of the total reinforcing filler, in this latter case associated, for example, with carbon black.

Preferably, in the rubber compositions according to the invention, the reinforcing inorganic filler constitutes the majority, i.e. more than 50% by weight, of the total reinforcing filler, more preferably more than 80% by weight of this total reinforcing filler.

In the present application, "reinforcing inorganic filler" is understood in known manner to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tire-grade carbon black filler in its reinforcement function.

Preferably, the reinforcing inorganic filler is a mineral filler of the siliceous type, in particular silica ($SiO_2$), or of the aluminous type, in particular alumina ($Al_2O_3$) or aluminium (oxide-)hydroxides, or a mixture of these different fillers.

The silica used may be any reinforcing silica known to the person skilled in the art, in particular any precipitated or pyrogenic silica having a BET surface area and a specific CTAB surface area both of which are less than 450 $m^2/g$, preferably from 30 to 400 $m_2/g$. Highly dispersible precipitated silicas (referred to as "HD") are preferred, in particular when the invention is used for the manufacture of tires having a low rolling resistance; "highly dispersible silica" is understood in known manner to mean any silica having a substantial ability to disagglomerate and to disperse in an elastomeric matrix, which can be observed in known manner by electron or optical microscopy on thin sections. Non-limitative examples of such preferred highly dispersible silicas which may be mentioned are the silicas Ultrasil 7000 and Ultrasil 7005 from Degussa, the silicas Zeosil 1165 MP, 1135 MP and 1115 MP from Rhodia, the silica Hi-Sil EZ150G from PPG, the silicas Zeopol 8715, 8745 and 8755 from Huber, and treated precipitated silicas such as, for example, the aluminium-"doped" silicas described in application EP-A-0735088.

The reinforcing alumina preferably used is a highly dispersible alumina having a BET surface area from 30 to 400 $m^2/g$, more preferably between 60 and 250 $m^2/g$, and an average particle size at most equal to 500 nm, more preferably at most equal to 200 nm, as described in the aforementioned application EP-A-0810258. Non-limitative examples of such reinforcing aluminas are in particular the aluminas "Baikalox", "A125" or "CR125" (from Baikowski), "APA-100RDX" (from Condea), "Aluminoxid C" (from Degussa) or "AKP-G015" (Sumitomo Chemicals).

By way of other examples of reinforcing inorganic filler capable of being used in the rubber compositions of the invention, mention may also be made of the aluminium (oxide-) hydroxides or the specific titanium oxides described in the aforementioned applications WO99/28376, WO00/73372, WO00/73373.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible siliceous and/or aluminous fillers such as described above.

When the rubber compositions of the invention are used as treads for tires, the reinforcing inorganic filler used, in particular if it is silica, preferably has a BET surface area of between 60 and 250 $m^2/g$, more preferably between 80 and 200 $m^2/g$.

The reinforcing inorganic filler may also be used in a blend (mixture) with carbon black. Suitable carbon blacks are all the carbon blacks, in particular the blacks of the type HAF, ISAF and SAF, which are conventionally used in tires, and particularly in treads for tires. As non-limitative examples of such blacks, mention may be made of the blacks N115, N134, N234, N339, N347 and N375.

The amount of carbon black present in the total reinforcing filler may vary within wide limits, this amount of carbon black preferably being less than the amount of reinforcing inorganic filler present in the rubber composition.

In the compositions according to the invention, it is however preferred to use in association with the reinforcing inorganic filler a carbon black in a small proportion, in a preferred amount of between 2 and 20 phr, more preferably within a range of 5 to 15 phr (parts by weight per hundred parts of elastomer). Within the ranges indicated, there is a benefit to be had from the colouring properties (black pigmentation agent) and anti-UV properties of the carbon blacks, without furthermore adversely affecting the typical performance provided by the reinforcing inorganic filler, namely low hysteresis (reduced rolling resistance) and high adhesion both on wet ground and on snow-covered or icy ground.

Preferably, the amount of total reinforcing filler (reinforcing inorganic filler plus carbon black if applicable) is between 10 and 200 phr, more preferably between 20 and 150 phr (parts by weight per hundred parts of elastomer), the optimum differing according to the intended applications; in fact, the level of reinforcement expected of a bicycle tire, for example, is in known manner distinctly lower than that required for a tire capable of travelling at a sustained high speed, for example a motorcycle tire, a passenger-vehicle tire or a tire for a utility vehicle such as a heavy vehicle.

For treads for tires which are liable to travel at high speed, the quantity of reinforcing inorganic filler, in particular if it is silica, is preferably between 30 and 120 phr, more preferably between 30 and 100 phr.

In the present specification, the BET specific surface area is determined in known manner, in accordance with the method of Brunauer, Emmett and Teller described in "The Journal of the American Chemical Society", vol. 60, page 309, February 1938, and corresponding to French standard NF T 45-007 (November 1987); the CTAB specific surface area is the external surface area determined in accordance with the same Standard NF T 45-007.

Finally, the person skilled in the art will understand that, as filler equivalent to the reinforcing inorganic filler described in the present section, there could be used a reinforcing filler of organic type, in particular a carbon black for tires (see for example WO99/28380), covered at least in part with an inorganic layer which for its part in known manner requires the use of a coupling agent to provide the bond to the elastomer.

II-3. Coupling Agent

The coupling agent used in the rubber compositions of the invention is thus an at last bifunctional organosilane providing the link between the diene elastomer and the reinforcing inorganic filler, and comprising for each molecule:

on one hand at least one functional group ("X" function) capable of forming a stable bond with the diene elastomer;

on the other hand, and this is an essential characteristic of the invention, as the "Y" function at least one hydroxyl group (OH) on a silicon atom, said function being known as a hydroxysilyl function ($\equiv$Si—OH), which allows the function to graft onto the reinforcing inorganic filler.

Without the following definitions being limitative, the compositions of the invention are preferably implemented with a sulfurised hydroxysilane, i.e. which bears as X function a functional group comprising sulfur, in particular a polysulfide grouping $S_x$ (where $x \geq 2$, i.e. including the disulfide grouping).

Preferred examples of hydroxysilane polysulfides which may in particular be mentioned are the hydroxysilane polysulfides of the formula (I) below:

$$(HO)_a R_{(3-a)} Si-R'-S_x-R'-SiR_{(3-b)}(OH)_b \quad (I)$$

in which:
- the radicals R, which may be identical or different, preferably comprise from 1 to 15 carbon atoms;
- the radicals R', which may be identical or different, are divalent groups intended to link the polysulfide group to two silicon atoms and preferably comprise from 1 to 18 carbon atoms;
- a and b, which may be identical or different, are equal to 1 or 2;
- x is greater than or equal to 2.

In this formula (I), the "X" function of the coupling agent is the polysulfide function $S_x$ attached to two silicon atoms via radicals R', while the Y function is the hydroxysilyl function (≡Si—OH) attached to each end.

The radicals R, which may be identical or different, straight-chain or branched, comprising preferably 1 to 15 carbon atoms, are more preferably selected from anong alkyls, cycloalkyls or aryls, in particular from among $C_1$-$C_6$ alkyls, $C_5$-$C_8$ cycloalkyls and the phenyl radical. Among these radicals, those selected from the group consisting of methyl, ethyl, n-propyl, isopropyl, n-butyl, sec.-butyl, tert.-butyl, n-pentyl, neopentyl, n-hexyl, 2-ethylhexyl, n-octyl, isooctyl, cyclopentyl, cyclohexyl, 2-methylcyclohexyl, phenyl, toluyl, benzyl may in particular be mentioned by way of example.

More preferably still, the radicals R, which may be identical or different, are $C_1$-$C_3$ alkyls (namely methyl, ethyl, n-propyl, isopropyl) and are very particularly selected from among methyl and ethyl.

The radicals R', which may be identical or different, substituted or unsubstituted, are preferably hydrocarbon radicals, saturated or unsaturated, comprising from 1 to 18 carbon atoms, the hydrocarbon chain of these radicals R' possibly being interrupted by at least one heteroatom such as O, S or N. In particular $C_1$-$C_{18}$ alkylene groups or $C_6$-$C_{12}$ arylene groups, more particularly $C_1$-$C_{10}$ alkylenes, notably $C_1$-$C_4$ alkylenes, in particular those selected from among methylene, ethylene and propylene, are suitable.

In other words, the invention is more preferably implemented with a bis-(hydroxy-($C_1$-$C_{18}$)-alkyl-silyl-($C_1$-$C_{15}$) alkyl) polysulfide (symmetrical or asymmetrical with regard to the nature of the radicals R or R') of the general formula (I) above, in particular a bis-(hydroxy-($C_1$-$C_3$)-alkyl-silylpropyl) polysulfide, in which there are present a single or two hydroxyl groups (plus, respectively, two or only one alkyl group) per silicon atom.

A monohydroxysilane is preferably used, i.e. a hydroxysilane comprising a single hydroxyl function (OH) per silicon atom (a=b=1).

Accordingly, among the compounds of the formula (I) above, the invention is more preferably implemented with a monohydroxysilane polysulfide, i.e. a compound of the general formula (II) below:

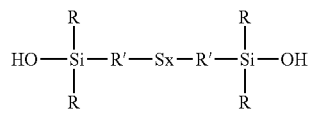

Among the organosilanes of the formula (II), those which are particularly preferred are those in which the radicals R are $C_1$-$C_3$ alkyls, the radicals R' are $C_1$-$C_4$ alkylenes, x is greater than or equal to 2.

Among these latter, bis-[($C_1$-$C_4$)-alkyldimethylsilanol] polysulfides, where R=Me (methyl) of the specific formula (II-1) below, may in particular be mentioned:

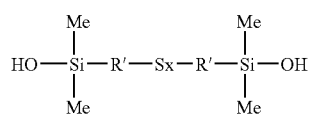

in which $x \geq 2$ and the radicals R' are $C_1$-$C_4$ alkylene, in particular methylene, ethylene or propylene, more particularly propylene.

By way of example, the invention is advantageously implemented with a bis-(propyldimethylsilanol) polysulfide of the specific formula:

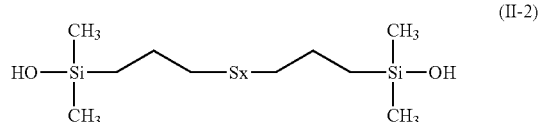

The number x of sulfur atoms in these hydroxysilanes may vary widely, for example from 2 to 9, depending upon the particular conditions under which the hydroxysilane was synthesised; however, the values of x are preferably selected within the range from 2 (disulfides) to 6 (hexasulfides) and including the corresponding trisulfides (x=3), tetrasulfides (x=4) and pentasulfides (x=5). More preferably still, x is selected from within the range from 2 to 4.

The polysulfurised monohydroxysilanes of the formulae (II) (in particular II-1 or II-2) above may be prepared in accordance with a synthesis comprising the following steps (R and R' having the above meanings):

the starting compound is a halogenated organosilane (hereafter product A) of the formula (A) (Hal=halogen):

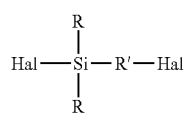

said organosilane is optionally subjected to alcoholysis under the action of an alcohol (R"—OH) in the presence of an organic base intended to scavenge the resultant acid halide, in order to obtain a monoalkoxysilane (hereafter product B) of the formula (B):

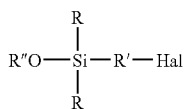

hydrolysis by the action of a hydroxyl donor is performed in an inert organic solvent:
  either on the product (A) in the presence, in this case, of an organic base to scavenge the resultant acid halide, the hydroxyl donor being water;
  or, if applicable, on the product (B), the hydroxyl donor being an inorganic base and the organic solvent a polar solvent,
in order to obtain a monohydroxysilane (product C) of the formula (C):

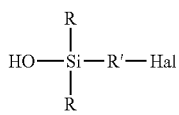

finally, a sulfuration stage is performed on the product C by the action of a polysulfide to give rise to the intended product of the formula (II).

Certain stages (alcoholysis, sulfuration) of this process have already been applied, at least in general terms, to the synthesis of sulfurised alkoxysilanes, such as mercaptoalkoxysilanes or polysulfide alkoxysilanes (see in particular FR-A-2149339 or U.S. Pat. No. 4,076,550, FR-A-2206330, EP-A-0694552 or U.S. Pat. No. 5,405,985). However, as far as the Applicants are aware, the above stages have never hitherto been described in combination in order to obtain sulfurised hydroxysilanes.

The halogens (Hal) of the starting silane (product A) may be identical or different and preferably be selected from among bromine and chlorine; chlorine is more preferably used. Generally, the starting halosilanes (products A) and their intermediate derivatives (products B or C) are liquids; they may thus be used as they are or alternatively diluted in an appropriate solvent during the implementation of the various stages of the process of the invention.

The first, optional, alcoholysis stage thus consists in replacing the halogen (Hal) borne by the silicon atom of the product A with the alkoxyl group (OR") of an alcohol in the presence of an organic base intended to scavenge the acid halide liberated during the course of the reaction. The hydrocarbon radical R" of the alcohol (R"—OH) preferably comprises from 1 to 8 carbon atoms; it is more preferably selected from among $C_1$-$C_6$ alkyls, more preferably still from among $C_1$-$C_3$ alkyls, in particular methyl or ethyl. An amine, preferably a tertiary amine such as triethylamine may be used as the organic base intended to scavenge the acid halide which is formed. In order to improve scavenging of the acid halide, alcoholysis is performed at a temperature which is preferably less than 15° C., more preferably less than 10° C.

The hydrolysis stage may also be performed directly on the starting halogenated silane (product A), by the action of water in an inert inorganic solvent, for example an ether, and in the presence of an organic base intended, as above, to scavenge the acid halide which is formed.

The starting halogenated silane is, however, preferably alcoholysed before being hydrolysed. This hydrolysis of the product B is carried out in a polar organic solvent, preferably an alcohol, by the action of an inorganic base in an aqueous solution; the inorganic base is preferably an alkali metal or alkaline-earth metal hydroxide, in particular sodium hydroxide (NaOH). The base is preferably used in slight excess, this excess being neutralised at the end of the reaction by a weak acid such as potassium dihydrogenphosphate. The polar organic solvent is preferably a $C_1$-$C_6$ alcohol, more preferably a $C_1$-$C_3$ alcohol, more particularly methanol.

The final sulfuration stage may be performed using an ammonium or metal polysulfide (x≧2), of the formula $M_2S_x$ or $M'S_x$ (M=alkali metal or $NH_4$; M'=Zn or alkaline-earth metal); examples of such compounds are the polysulfides of Na, K, Cs, Rb, Ca, Mg, Zn and $NH_4$, x preferably being within the range from 2 to 6, more preferably from 2 to 4. A sodium polysulfide $Na_2S_x$, in particular $Na_2S_2$, $Na_2S_3$, $Na_2S_4$, $Na_2S_5$, $Na_2S_6$, this polysulfide preferably being obtained by the action of sulfur ($S_8$) on $Na_2S$, is preferably used. In known manner, the ammonium or metal polysulfides are prepared in a solvent, which may be organic or inorganic, such as for example water, alcohols, ketones or ethers, solvents in which the reaction partners are partially or entirely soluble.

However, in order to eliminate any risk of forming secondary products of the alkoxysilane polysulfide type, due to a parasitic alcoholysis reaction of the silanol functions of product C, it is preferred to perform the sulfuration stage in the absence of any alcohol; in this case, the reaction is preferably performed in aqueous phase, more preferably in a biphasic water/organic solvent medium (for example toluene, xylene, benzene, heptane or equivalents), as described in the aforementioned documents EP-A-0694552 or U.S. Pat. No. 5,405,985 relating to the synthesis of polysulfurised alkoxysilanes. The sulfuration reaction is then performed in known manner in the presence of a phase-transfer catalyst and a salt of the formula M"Hal or M"$SO_4$ (M" selected from among Li, N a, K; H al selected from among F, Cl and B r). The s alt u sed is preferably selected from among NaCl, NaBr, $Na_2SO_4$; NaCl is more preferably used. The quantity of salt may vary, for example, from 10% by weight of the aqueous solution up to complete saturation of the solution. The phase-transfer catalyst is, for example, tetrabutylammonium bromide (TBAB).

The sulfuration stage is preferably performed under an inert gas such as argon. The temperature of the reaction medium is not critical, it being, for example, possible to work at ambient temperature; it is, however, preferred work at elevated temperature to increase the speed of reaction, for example between 60° C. and 100° C., even up to the boiling point of the solvent. The molar ratio between hydroxysilane (product C) and the (ammonium or metal) polysulfide is preferably adjusted so as to achieve a slight excess of polysulfide relative to the stoichiometric quantity.

If sulfuration is performed in the organic phase, product C is itself preferably pre-diluted in the inert organic solvent such as an alcohol, a ketone or an ether. Once the reaction is complete, the salt (metal halide) which has formed is filtered out and the organic solvent is removed from the filtrate by vacuum distillation. When sulfuration is performed in the aqueous phase or biphasic medium (water/organic solvent), if applicable, the organic phase containing the product D is isolated and the residual solvent is distilled under a vacuum.

The polysulfurised hydroxysilanes synthesised in accordance with the process described above are in fact mixtures of polysulfides (for example of x=2 to x=9), which consequently have an average value of x which is other than a n integer. The intended average value for x is preferably between 2 and 6, more preferably within a range from 2 to 4.

More generally, in the rubber compositions of the invention, the hydroxysilane content is preferably greater than 1 phr, more preferably between 2 and 20 phr. Below the minimum amounts indicated, the effect is susceptible to being inadequate, whereas beyond the maximum amount advocated generally no further improvement in coupling is observed, while the costs of the composition increase; for these various reasons, this hydroxysilane content is still more preferably between 3 and 12 phr.

The person skilled in the art will be able to adjust this content of component C according to the intended application, in particular to the part of the tire for which the rubber composition of the invention is intended, to the nature of the diene elastomer and to the quantity of reinforcing inorganic filler used. Of course, in order to reduce the costs of the rubber compositions, it is desirable to use as little as possible thereof, that is to say what is just necessary for sufficient coupling between the diene elastomer and the reinforcing inorganic filler. Its effectiveness makes it possible, in a large number of cases, to use the hydroxysilane in a preferred amount representing between 0.5% and 20% by weight relative to the quantity of reinforcing inorganic filler; amounts less than 15%, in particular less than 10%, are more particularly preferred.

The hydroxysilanes previously described have proved sufficiently effective on their own for coupling a diene elastomer and a reinforcing inorganic filler such as silica. Without this being limitative, they may advantageously constitute the only coupling agent present in the rubber compositions of the invention.

Finally, the person skilled in the art will understand that the hydroxysilanes previously described could be grafted in advance either onto the diene elastomer (via the "X" function) of the composition of the invention or, preferably, onto the reinforcing inorganic filler (via the "Y" function), it then being possible to bond the inorganic filler "precoupled" in this manner to the diene elastomer via the free "X" function.

II-4. Various Additives

Of course, the rubber compositions according to the invention also comprise all or part of the additives usually used in rubber compositions comprising an isoprene elastomer and intended for the manufacture of tires or tire treads, such as, for example, plasticisers, protective agents such as anti-ozone waxes, chemical antiozonants, antioxidants, anti-fatigue agents, adhesion promoters, a cross-linking system such as those based either on sulfur or on sulfur donors and/or peroxide and/or bismaleimide, vulcanization accelerators, vulcanization activators, etc. There may also be associated with the reinforcing inorganic filler, if necessary, a conventional poorly reinforcing or non-reinforcing inorganic filler, for example particles of clay, bentonite, talc, chalk, kaolin or conventional (non-reinforcing) titanium oxides.

The rubber compositions according to the invention may also contain, in addition to the hydroxysilane coupling agents described above, agents for covering the reinforcing inorganic filler, comprising for example only the Y function, or more generally processing aids liable, in known manner, owing to an improvement in the dispersion of the inorganic filler in the rubber matrix and to a reduction in the viscosity of the compositions, to improve their ability to be worked in the uncured state, these agents being, for example, alkylalkoxysilanes, in particular alkyltriethoxysilanes, such as for example 1-octyltriethoxysilane sold by Degussa-Hüls under the name Dynasylan Octeo or 1-hexadecyltriethoxysilane sold by Degussa-Hüls under the name Si216, polyols, polyethers, (for example polyethylene glycols), primary, secondary or tertiary amines (for example trialkanolamines), hydroxylated or hydrolysable polyorganosiloxanes, for example α,ω-dihydroxypolyorganosiloxanes (in particular α,ω-dihydroxypolydimethylsiloxanes).

II-5. Preparation of the Rubber Compositions

The compositions are produced in suitable mixers, using two successive preparation phases well-known to the person skilled in the art: a first phase of thermomechanical working or kneading (sometimes referred to as "non-productive" phase) at high temperature, up to a maximum temperature (denoted $T_{max}$) of between 110° C. and 190° C., preferably between 130° C. and 180° C., followed by a second phase of mechanical working (sometimes referred to as "productive" phase) at lower temperature, typically less than 110° C., for example between 40° C. and 100° C., during which finishing phase the cross-linking or vulcanization system is incorporated; such phases have been described for example in the aforementioned applications EP-A-0501227, EP-A-0735088, EP-A-0810258, EP-A-0881252, WO99/28376, WO00/05300 or WO00/05301.

The process for manufacturing compositions according to the invention is characterised in that at least the reinforcing inorganic filler and the hydroxysilane coupling agent are incorporated by kneading into the diene elastomer during the first, "non-productive" phase, i.e. at least these various base constituents are introduced into a mixer and are kneaded thermomechanically in one or more stages until a maximum temperature of between 110° C. and 190° C., preferably of between 130° C. and 180° C. is reached.

By way of example, the first (non-productive) phase is performed in a single thermomechanical stage during which all the base constituents necessary, any additional covering agents or processing agents and various other additives, with the exception of the vulcanization system, are introduced into a suitable internal mixer, such as a conventional internal mixer. A second stage of thermomechanical working may be added, in this internal mixer, after the mixture has dropped and after intermediate cooling (cooling temperature preferably less than 100° C.), with the aim of making the compositions undergo complementary heat treatment, in particular in order to improve further the dispersion of the reinforcing inorganic filler and its coupling agent in the elastomeric matrix. The total duration of the kneading, in this non-productive phase, is preferably between 2 and 10 minutes.

After cooling of the mixture thus obtained, the vulcanization system is then incorporated at low temperature, generally in an external mixer such as an open mill; the entire composition is then mixed (productive phase) for several minutes, for example between 5 and 15 minutes.

The final composition thus obtained is then calendered, for example in the form of a film or a sheet, or alternatively extruded, for example in order to form a rubber profiled element used for manufacturing semi-finished products such as treads, crown plies, sidewalls, carcass plies, beads, protectors, inner tubes or airtight internal rubbers for tubeless tires.

Vulcanization (or curing) is carried out in known manner at a temperature generally between 130° C. and 200° C., for a sufficient time which may vary, for example, between 5 and 90 minutes, depending, in particular, on the curing temperature, the vulcanization system adopted and the vulcanization kinetics of the composition in question, or alternatively on the size of the tire.

The vulcanization system properties preferably based on sulfur and a primary vulcanization accelerator, in particular an accelerator of the sulfenamide type. To this basic vulcanization system there are added, incorporated during the first non-productive phase and/or during the productive phase, various known secondary accelerators or vulcanization activators such as zinc oxide, stearic acid, guanidine derivatives (in particular diphenylguanidine), etc. The sulfur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

It goes without saying that the invention relates to the rubber compositions previously described, both in the "uncured" state (i.e. before curing) and in the "cured" or vulcanized state (i.e. after cross-linking or vulcanization).

The compositions according to the invention may be used alone or in a blend (i.e. in a mixture) with any other rubber composition which can be used for manufacturing tires.

III. EXAMPLES OF EMBODIMENT OF THE INVENTION

In the following examples of embodiment, the invention is implemented with a bis-(propyldimethylsilanol) polysulfide of the specific formula (II-2):

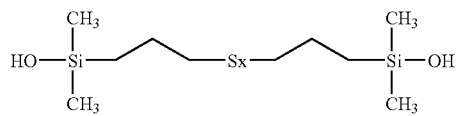

III-1. Synthesis of the Polysulfurised Hydroxysilane

This test describes the synthesis of the polysulfide of the formula (II-2) above (hereafter denoted product D) using a process performed in two or three stages starting from chloropropyldimethylchlorosilane (hereafter denoted product A), via chloropropyldimethylethoxysilane (hereafter denoted product B; optional step) and chloropropyldimethylsilanol (hereafter denoted product C).

The synthesis scheme used is as follows:

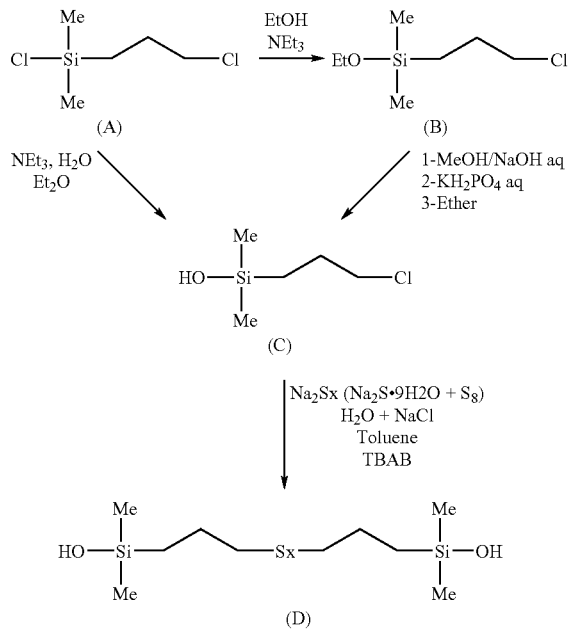

a) Preparation of Chloropropyildimethylethoxysilane (Product B)

The first stage comprises an alcoholysis which permits the replacement of the chlorine borne by the silicon atom of product A by an ethoxyl group (EtO) of the ethanol, this reaction being performed in the presence of triethylamine intended to scavenge the hydrochloric acid liberated during the reaction.

950 ml of ethanol (Normapur grade) then 288 mL of triethylamine (2.07 mol or 209 g) are introduced under a stream of argon using a syringe into a 2 L (litre) three-necked flask (which has previously been dried in an oven for 24 h), fitted with a condenser and equipped with a magnetic stirrer. The mixture is then cooled to a temperature of approx. 5° C. before addition of product A (237.7 g or 1.38 mol, product of ABCR sold under the reference SIC2336.0) is begun using a peristaltic pump; the liberated hydrochloric acid is immediately scavenged by the triethylamine to form triethylamine chlorohydrate.

Once addition is complete (after approx. 8 h), the ice bath is removed while stirring is continued at ambient temperature overnight under a stream of argon. After eight hours, GPC (gas phase chromatography) analysis demonstrates the disappearance of the peak corresponding to starting product A and the formation of chloropropyldimethylethoxysilane (product B). The reaction medium is then filtered through an Alhin tube in order to separate the product B dissolved in ethanol from the triethylamine chlorohydrate.

The filtrate containing the product B is concentrated then vacuum distilled (2 mm Hg; oil bath temperature 70° C.; overhead temperature 45° C.), in order to remove the excess free triethylamine and isolate product B in the pure state.

In this manner, 160 g of a colourless liquid are collected, analysis of which by NMR and mass spectrometry reveals that it is indeed the intended product B of the following formula:

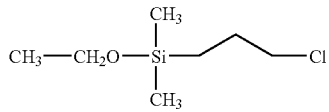

b) Preparation of Chloropropyldimethylsilanol (Product C)

This second stage consists of hydrolysing the preceding ethoxysilane (in solution in methanol) to obtain the hydroxysilane. This reaction is carried out by the action of an aqueous solution of NaOH; after the reaction, the excess base introduced initially is neutralised with potassium dihydrogenphosphate.

2.62 g of sodium hydroxide (65 mmol or 2.4 equivalents relative to product B) are introduced into a 100 mL three-necked flask fitted with a condenser and equipped with a magnetic stirrer and are dissolved in 15 mL of demineralised water. Once dissolution is complete and when the temperature of the solution has returned to ambient temperature, 20 mL of methanol are added followed by, using a dropping funnel, the previously prepared product B (5 g or 27.7 mmol) diluted in 35 mL of methanol. The reaction medium is then stirred for 90 minutes, then poured into an aqueous solution of potassium dihydrogenphosphate (16 g of $KH_2PO_4$ in 200 mL of water). The resultant solution, which has a pH of 7, is stirred for a few minutes before being combined with 200 mL of ether intended to extract the product C which has formed. The biphasic medium is then stirred for approx. 30 to 45 min, then placed in a separating funnel. The isolated organic phase is washed once with water then dried over MgSO$_4$ before being filtered and then concentrated under a vacuum.

The GPC chromatogram of the crude reaction product collected in this manner exhibits three peaks which may respectively be assigned to (i) chloropropyldimethylmethoxysilane, probably arising from the reaction of methanol on product B (of the order of 2% of units according to $^1$H NMR), (ii) the intended product C, in a large majority (85% of units according to $^1$H NMR), together with (iii) bis(chloropropyl) tetramethyldisiloxane (present in an amount of 13% of units).

The product C can be isolated by vacuum distillation, performed in a bulb tube oven (Kugelrohr). During this distillation, the selected temperature of the oven is preferably below 45° C. in order to minimise any risk of the product C condensing to yield the corresponding disiloxane. Thus, once the chloropropyldimethylmethoxysilane has been removed by applying a vacuum of 1.3 mbar and a temperature of 35° C., product C is isolated under a vacuum of 1 mbar by raising the temperature to 40° C.; due to its higher boiling point, the bis(chloropropyl)tetramethyldisiloxane remains in the distillation flask.

In this manner, 2.48 g of a pure colourless liquid are isolated, analysis of which by NMR and mass spectrometry reveals that product C of the following formula has been obtained:

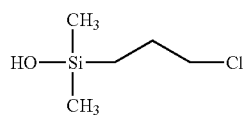

As has already been explained previously, product C above may also be prepared directly by hydrolysing the starting product A in an inert organic solvent (ether), in the presence of water as hydroxyl donor and of triethylamine intended to scavenge the hydrochloric acid which is liberated. An excess of water is preferably introduced so as to promote the desired reaction and to avoid the condensation reaction of the resultant silanol on the added chlorosilane. Using a slight excess of triethylamine ensures that all the hydrochloric acid is scavenged, any residual triethylamine being distilled off once the reaction is complete.

More specifically, the following method is used: 9.78 mL of triethylamine (70.1 mmol, or 1.5 equivalents relative to product A), 3.36 g of water (187 mmol, or 4 equivalents relative to product A), then 150 mL of ether are introduced into a 500 mL three-necked flask fitted with a condenser and equipped with a magnetic stirrer. This solution is cooled with an ice bath (temperature <10° C.) before slowly adding a solution of product A (8.0 g or 46.7 mmol in 80 mL of ether). A white precipitate, corresponding to triethylamine chlorohydrate, appears immediately. Once addition of product A is complete, the reaction medium is stirred for 30 min, while maintaining a temperature of less than 10° C. The precipitate which has formed is then filtered out and the collected filtrate is dried over magnesium sulfate, filtered and then concentrated under a vacuum. The residual triethylamine is removed by distillation. In this manner, 6.1 g of a brilliant yellow liquid are collected which, according to analysis by NMR and mass spectrometry, corresponds to the intended product C (product purity greater than 95%).

c) Preparation of Polysulfurised Hydroxysilane (Product D)

In this final stage, the sodium polysulfide, created by inserting sodium into sodium sulfide Na$_2$S in an aqueous medium, replaces the chlorine atom with two molecules of product C in solution in toluene. The reaction is performed in the presence of a phase-transfer catalyst (TBAB) and sodium chloride, NaCl.

3.50 g (or 14.5 mmol) of Na$_2$S.9H$_2$O together with 1.40 g (or 43.7 mmol) of sulfur, which are dissolved in 40 mL of an aqueous NaCl solution (5.0 g or 85.8 mmol) and 8 mL of toluene are introduced into a 250 mL three-necked flask fitted with a condenser and equipped with a magnetic stirrer. This mixture is heated to 85° C.; as the temperature rises, the reaction medium is observed to change in colour from yellow to a deep red.

Once the setpoint temperature has been reached, 0.25 g of TBAB (or 0.77 mmol) is added in a single portion, then dropwise addition of product C (4.60 g or 28.6 mmol) dissolved in 30 mL of toluene is begun. During addition, the toluene phase is of a bright red colour progressively turning towards orange, while the initially bright red aqueous phase becomes paler, finally becoming colourless and clear, once addition is complete. The reaction is thus continued for 75 min at the temperature of 85° C., then the reaction medium is cooled under argon.

The reaction medium is then transferred into a separating funnel so as to isolate the toluene phase, which is dried over magnesium sulfate after being washed with water. The organic solution is then filtered and reextracted with ether before being distilled in a bulb tube oven (40° C.) before recovering the residual chloropropyldimethylsilanol (product C).

Finally, 3.82 g of a viscous red-orange liquid are recovered, analysis of which by NMR and mass spectrometry confirm that it comprises (in mol %):

approx. 95% of bis-(propyldimethylsilanol) polysulfide of the formula (II-2):

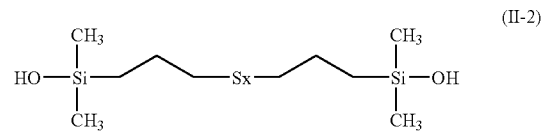

approx. 5% of cyclic siloxane compound of the formula (II-3):

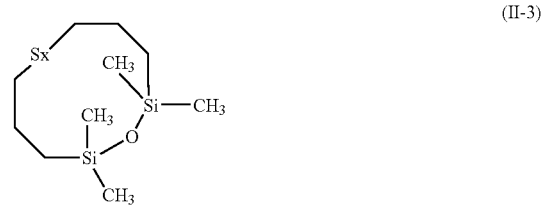

The product D synthesised in this manner in fact consists of a distribution of polysulfides ranging from the disulfide (x=2) to hexasulfide (x=6), centred on an average value of x=3.7. The disulfide S$_2$ content, determined by NMR, is equal to approx. 18% of the polysulfide units.

This product thus consists, as is the case in particular for alkoxysilane polysulfides such as TESPT, of a distribution of polysulfides having an average value of x close to 4. It will be understood that modified synthesis conditions could permit the production of other polysulfide distributions having variable average values of x, but preferably between 2 and 6, more preferably in a range from 2 to 4.

III-2. Preparation of the Rubber Compositions

For the following tests, the procedure is as follows: the diene elastomer (or the mixture of diene elastomers, if applicable), the reinforcing filler, the coupling agent, then the various other ingredients, with the exception of the vulcanization system, are introduced into an internal mixer filled to 70%, the initial tank temperature of which is a pproximately 60° C. Thermomechanical working (non-productive phase) is then performed in one or two stages (total duration of kneading equal to about 7 minutes), until a maximum "dropping" temperature of about 165° C. is reached. The mixture thus obtained is recovered, is cooled and then sulfur and sulfenamide accelerator are added on an external mixer (homo-finisher) at 30° C., by mixing everything (productive phase) for 3 to 4 minutes.

The compositions thus obtained are then calendered in the form of sheets (thickness of 2 to 3 mm) or of thin films of rubber in order to measure their physical or mechanical properties, or extruded to form profiled elements which can be used directly, after cutting out and/or assembly to the dimensions desired, for example as semi-finished products for tires, in particular as treads for tires.

III-3. Characterisation Tests

The object of this test is to demonstrate the improved performance of a composition according to the invention, compared with a conventional composition using TESPT.

For this, therefore, two rubber compositions based on diene elastomers (SSBR and BR) and reinforced with silica, denoted C-1 and C-2, are prepared, these compositions being intended for treads for passenger-car tires. These compositions are identical with the exception of the coupling agent used:

composition C-1: TESPT;
composition C-2: product D synthesised above.

The two organosilanes tested are used in an amount of less than 8 phr, this quantity being less than 10% by weight relative to the quantity of reinforcing inorganic filler. It will be recalled that TEPST is bis(3-triethoxysilylpropyl) tetrasulfide, of the formula $[(C_2H_5O)_3Si(CH_2)_3S_2]_2$; it is sold, for example, by Degussa under the name "Si69" (or "X50S" when it is supported to 50% by weight on carbon black), or alternatively by Witco under the name "Silquest A1289" (in both cases, a commercial mixture of polysulfides $S_x$ having an average value of x which is close to 4).

The full formula of TESPT is:

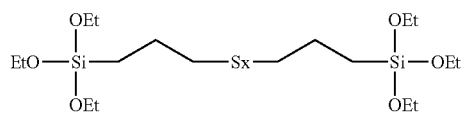

It will be noted that the above structure is very close to that of the hydroxysilane of the formula (II-2), this latter differing only in the presence of a hydroxyl group and two methyls instead of three conventional alkoxyl groups.

Tables 1 and 2 show the formulation of the two compositions (Table 1—amounts of the different products expressed in phr), and their properties before and after curing (approx. 30 min at 150° C.); the vulcanization system consists of sulfur and sulfenamide. The two compositions tested additionally comprise (not stated in Table 1) a small proportion of carbon black N330 (6 phr) used as a black pigment and anti-UV agent.

The attached FIGS. 1 and 2 respectively reproduce the rheograms (torque in dN·m as a function of duration of vulcanization in min) and modulus curves (in MPa) as a function of elongation (in %); these curves are denoted C1 and C2 on FIG. 1, then C1' and C2' on FIG. 2 and correspond respectively to compositions C-1 and C-2.

Examination of the various results of Table 2 gives rise to the following observations:

the composition of the invention C-2 exhibits a shorter scorching time than that of the control composition C-1, but this time T5 is sufficient to provide a satisfactory safety margin with regard to the problem of scorching;

the Mooney plasticity values remain low (85 to 90 MU) in all cases, the lowest value moreover being recorded on composition C-2; this is indicative of very good processability of the compositions of the invention in the uncured state, which is at least as good as that of conventional compositions using alkoxysilane polysulfides;

after curing, the composition of the invention C-2, in comparison with the control composition, exhibits modulus values at high deformation (M100 and M300) and an (M300/M100) ratio which are very close, these both being clear indicators to the person skilled in the art of the quality of reinforcement provided by the inorganic filler and its coupling agent;

hysteresis properties seem slightly improved for the composition of the invention, as illustrated by a lower $\tan(\delta)_{max}$ value (synonymous with low rolling resistance);

finally and above all, it will be noted that the composition of the invention is unexpectedly distinguished by a conversion rate constant K which is more than twice as high as that of the control composition; in other words, curing of the composition may be performed in a distinctly shorter time.

The rheograms of the attached FIG. 1 confirm the superiority of the composition of the invention C-2: induction time approaching that of the control composition; maximum torque identical to that of the control composition, but achieved in a distinctly shorter time; higher conversion rate constant K.

FIG. 2 also confirms the preceding observations: curve C2' (composition C-2) and curve C1' (control composition C-1) are largely coincide, in particular for the greater elongations which are representative of the reinforcement and thus of the wear resistance capabilities of the rubber.

In summary, the overall behaviour of composition C-2 of the invention not only reflects a high quality bond (or coupling) between the reinforcing inorganic filler and the diene elastomer, which is at least equal to that available with conventional alkoxysilane polysulfides such as TESPT, but also, unexpectedly, very distinctly improved vulcanizability.

Replacing these alkoxysilanes with hydroxysilanes also constitutes a considerable advantage with regard to the environment and the problem caused by emissions of VOC ("volatile organic compounds"), since the alkoxyl groups of these alkoxysilanes (such as the ethoxyl groups of TESPT) are in fact the cause of alcohol (ethanol) emissions, both during manufacture of the rubber compositions themselves and during curing of rubber articles incorporating these compositions.

The invention can be applied particularly advantageously in rubber compositions usable for the manufacture of treads for tires which have both low rolling resistance and high wear resistance, in particular when these treads are intended for tires for passenger vehicles or for industrial vehicles of the heavy-vehicle type.

TABLE 1

| Composition No. | C-1 | C-2 |
|---|---|---|
| SBR (1) | 75 | 75 |
| BR (2) | 25 | 25 |
| silica (3) | 80 | 80 |
| alkoxysilane (4) | 6.4 | — |
| product D (5) | — | 4.6 |
| DPG (6) | 1.5 | 1.5 |
| ZnO | 2.5 | 2.5 |
| stearic acid | 2 | 2 |
| antioxidant (7) | 1.9 | 1.9 |
| sulfur | 1.1 | 1.1 |
| accelerator (8) | 2 | 2 |

(1) SBR with 59.5% of 1,2-polybutadiene units; 26.5% of styrene; extended with 37.5% by weight of aromatic oil (or 37.5 phr of oil per 100 phr of dry SBR); Tg = −29° C.; expressed in dry SBR;
(2) BR with 4.3% of 1,2; 2.7% of trans; 93% of cis-1,4 (Tg = −106° C.);
(3) silica type "HD" - "Zeosil 1165 MP" from Rhodia in the form of micro-beads (BET and CTAB: approximately 150-160 m²/g);
(4) TESPT ("Si69" from DEGUSSA-HULS);
(5) product D synthesised (bis-(propyldimethylsilanol) polysulfide, 95 mol %);
(6) diphenylguanidine ("Vulcacit D" from Bayer);
(7) N-1,3-dimethylbutyl-N-phenyl-para-phenylenediamine ("Santoflex 6-PPD" from Flexsys);
(8) N-cyclohexyl-2-benzothiazyl sulfenamide ("Santocure CBS" from Flexsys).

TABLE 2

| Composition No. | C-1 | C-2 |
|---|---|---|
| Properties before curing: | | |
| ML1 + 4 (MU) | 90 | 85 |
| T5 (min) | 20 | 13 |
| $t_i$ (min) | 9 | 7 |
| $t_{99}$ (min) | 41 | 21 |
| K (min⁻¹) | 0.14 | 0.32 |
| $t_{99}$- $t_i$ (min) | 32 | 14 |
| Δ torque | 17.8 | 19.6 |
| Properties after curing: | | |
| M10 (MPa) | 7.0 | 6.8 |
| M100 (MPa) | 2.6 | 2.8 |
| M300 (MPa) | 4.4 | 4.3 |
| M300/M100 | 1.7 | 1.6 |
| tan (δ)$_{max}$ | 0.310 | 0.299 |
| Breaking stress (MPa) | 20.6 | 20.8 |
| Elongation at break (%) | 416 | 443 |

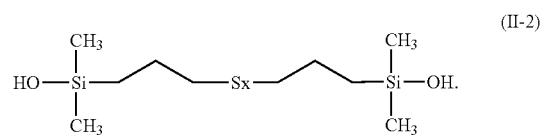

The invention claimed is:

1. An elastomer composition based on a diene elastomer, an inorganic filler as reinforcing filler, a polyfunctional organosilane as (inorganic filler/diene elastomer) coupling agent bearing at least two functions denoted "X" and "Y" which are graftable, on the one hand, to the elastomer by means of the X function and, on the other, to the inorganic filler by means of the Y function, wherein said organosilane is a hydroxysilane polysulfide, and wherein the hydroxysilane polysulfide is a monohydroxysilane polysulfide having the formula (II):

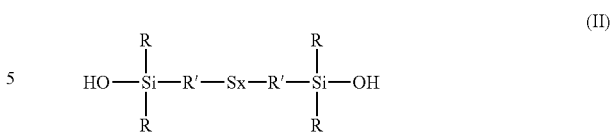

in which:
the radicals R, identical or different, are methyl, ethyl, n-propyl or isopropyl;
the radicals R', identical or different, are methylene, ethylene or propylene; and
x is equal to 2 or more,
wherein the quantity of the reinforcing inorganic filler is between 10 and 200 phr (parts by weight per hundred of elastomer); and
wherein the quantity of the hydroxysilane polysulfide is between 1 and 20 phr.

2. The composition according to claim 1, wherein the diene elastomer is selected from the group consisting of polybutadienes, natural rubber, synthetic polyisoprenes, butadiene copolymers, isoprene copolymers and mixtures thereof.

3. The composition according to claim 2, wherein the butadiene copolymers and isoprene copolymers are selected from the group consisting of butadiene-styrene copolymers, butadiene-isoprene copolymers, isoprene-styrene copolymers, butadiene-acrylonitrile copolymers, butadiene-styrene-isoprene copolymers and mixtures thereof.

4. The composition according to claim 1, wherein the radicals R are methyl.

5. The composition according to claim 4, wherein the hydroxysilane polysulfide is a bis-(propyldimethylsilanol) polysulfide having as formula (II-2):

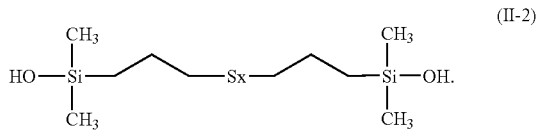

6. The composition according to claim 1, wherein the quantity of the hydroxysilane polysulfide is between 0.5% and 20% by weight relative to the quantity of reinforcing inorganic filler.

7. The composition according to claim 1, wherein more than 50% by weight of the reinforcing inorganic filler is silica.

8. The composition according to claim 1, further comprising carbon black.

9. The composition according to claim 8, wherein the carbon black is present in an amount between 2 and 20 phr.

10. The composition according to claim 9, wherein the carbon black is present in an amount lying within a range from 5 to 15 phr.

11. The composition according to claim 2, wherein the diene elastomer is a butadiene-styrene copolymer (SBR) having a styrene content of between 20% and 30% by weight, a content of vinyl bonds of the butadiene moiety of between 15% and 65%, a content of trans-1,4 bonds of between 20% and 75% and a glass transition temperature of between −20° C. and −55° C.

12. The composition according to claim 11, wherein the SBR is a SBR prepared in solution (SSBR).

13. The composition according to claim 11, wherein the SBR is used in a mixture with a polybutadiene.

14. The composition according to claim 13, wherein the polybutadiene has more than 90% cis-1,4 bonds.

15. The composition according to claim 2, wherein the diene elastomer is an isoprene elastomer.

16. The composition according to claim 15, wherein the diene elastomer is natural rubber or a synthetic polyisoprene.

17. The composition according to claim 1, wherein said composition is in the vulcanized state.

18. The composition according to claim 1, wherein the radical R' is propylene.

19. A tire comprising the composition according to claim 1.

20. A tire comprising the composition according to claim 3.

21. A tire comprising the composition according to claim 5.

22. A tire tread comprising the composition according to claim 1.

23. A tire tread comprising the composition according to claim 3.

24. A tire tread comprising the composition according to claim 5.

25. A process for preparing an elastomer composition having improved vulcanization kinetics, wherein there are incorporated into a diene elastomer at least an inorganic filler as reinforcing filler and a polyfunctional organosilane bearing at least two functions denoted "X" and "Y" as coupling agent, which functions are graftable, on the one hand, to the elastomer by means of the X function and, on the other, to the inorganic filler by means of the Y function, said organosilane being a hydroxysilane polysulfide, wherein the entire mixture is kneaded thermomechanically in one or more stages until a maximum temperature of between 110° C. and 190° C. is reached, and the hydroxysilane polysulfide is a monohydroxysilane polysulfide having the formula (II):

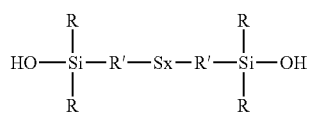

(II)

in which:
the radicals R, identical or different, are methyl, ethyl, n-propyl or isopropyl;
the radicals R', identical or different, are methylene, ethylene or propylene; and
x is equal to 2 or more,
wherein the quantity of the reinforcing inorganic filler is between 10 and 200 phr (parts by weight per hundred of elastomer); and
wherein the quantity of the hydroxysilane polysulfide is between 1 and 20 phr.

26. The process according to claim 25, wherein the diene elastomer is selected from the group consisting of polybutadienes, natural rubber, synthetic polyisoprenes, butadiene copolymers, isoprene copolymers and mixtures thereof.

27. The process according to claim 25, wherein the radicals R are methyl.

28. The process according to claim 27, wherein the hydroxysilane polysulfide is a bis-(propyldimethylsilanol) polysulfide having as formula (II-2):

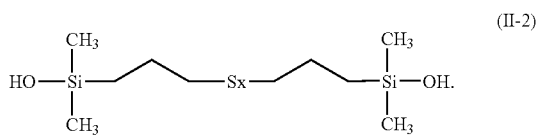

(II-2)

29. The process according to claim 25, wherein the quantity of the hydroxysilane polysulfide is between 0.5% and 20% by weight relative to the quantity of reinforcing inorganic filler.

30. The process according to claim 25, wherein more than 50% by weight of the reinforcing inorganic filler is silica.

31. The process according to claim 25, further comprising wherein there is further incorporated carbon black.

32. The process according to claim 31, wherein the carbon black is present in an amount between 2 and 20 phr.

33. The process according to claim 26, wherein the diene elastomer is a butadiene-styrene copolymer (SBR) having a styrene content of between 20% and 30% by weight, a content of vinyl bonds of the butadiene moiety of between 15% and 65%, a content of trans-1,4 bonds of between 20% and 75% and a glass transition temperature of between −20° C. and −55° C.

34. The process according to claim 30, wherein the diene elastomer is an isoprene elastomer.

35. The process according to claim 25, wherein the radical R' is propylene.

36. A process for coupling an inorganic filler and a diene elastomer, in a rubber composition, wherein there are incorporated into at least one diene elastomer at least one inorganic filler as reinforcing filler and a polyfunctional organosilane bearing at least two functions denoted "X" and "Y" which are graftable, on the one hand, to the elastomer by means of the X function and, on the other, to the inorganic filler by means of the Y function, said organosilane being a hydroxysilane polysulfide, wherein the entire mixture is kneaded thermomechanically in one or more stages until a maximum temperature of between 110° C. and 190° C. is reached, and the hydroxysilane polysulfide is a monohydroxysilane polysulfide having the formula (II):

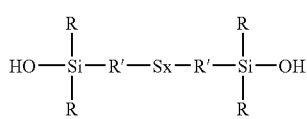

(II)

in which:
the radicals R, identical or different, are methyl, ethyl, n-propyl or isopropyl;
the radicals R', identical or different, are methylene, ethylene or propylene; and
x is equal to 2 or more,
wherein the quantity of the reinforcing inorganic filler is between 10 and 200 phr (parts by weight per hundred of elastomer); and
wherein the quantity of the hydroxysilane polysulfide is between 1 and 20 phr.

37. The process according to claim 36, wherein the diene elastomer is selected from the group consisting of polybutadienes, natural rubber, synthetic polyisoprenes, butadiene copolymers, isoprene copolymers and mixtures thereof.

38. The process according to claim 36, wherein the radical R' is propylene.

39. The process according to claim 36, wherein the radicals R are methyl.

40. The process according to claim 39, wherein the hydroxysilane polysulfide is a bis-(propyldimethylsilanol) polysulfide having as formula (II-2):